Feb. 25, 1941.   E. G. LINDER   2,233,263
RESONANT CAVITY OSCILLATOR
Filed Nov. 30, 1938   2 Sheets-Sheet 1
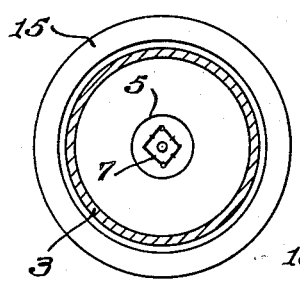
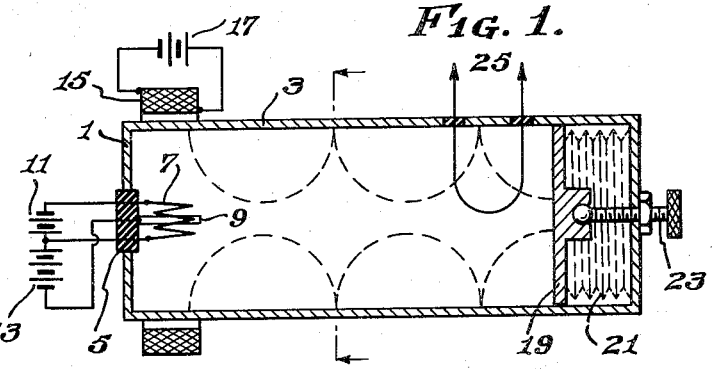
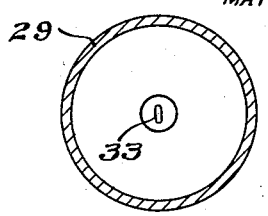
Inventor
*Ernest G. Linder*
By
Attorney Feb. 25, 1941.  E. G. LINDER  2,233,263
RESONANT CAVITY OSCILLATOR
Filed Nov. 30, 1938   2 Sheets-Sheet 2
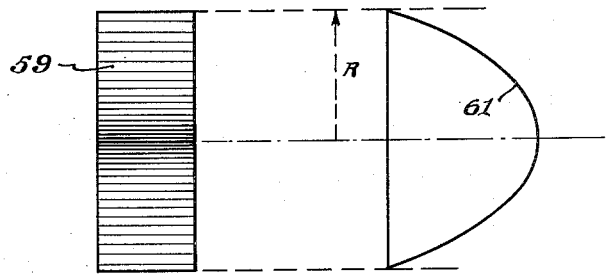
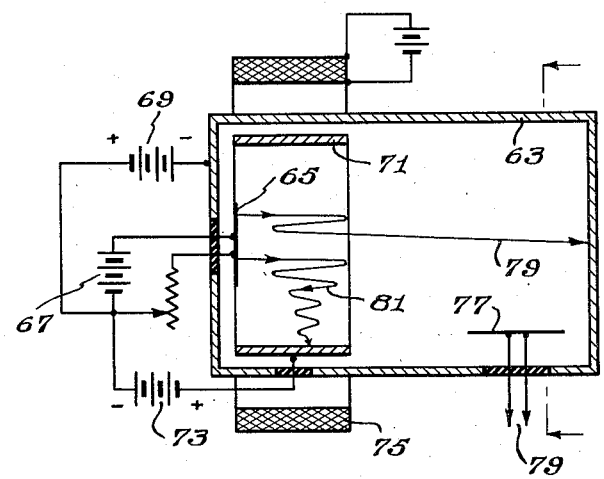
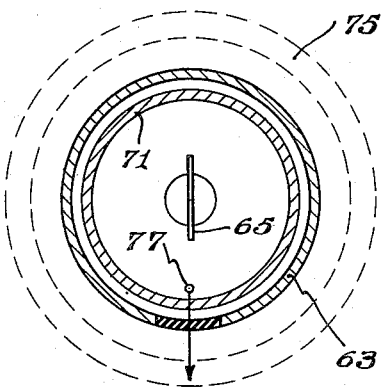
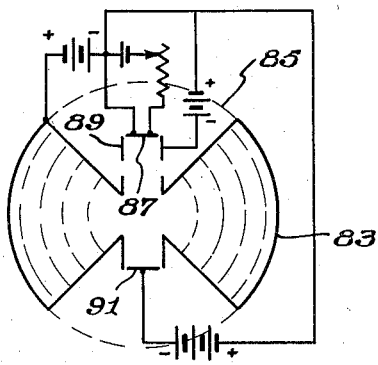
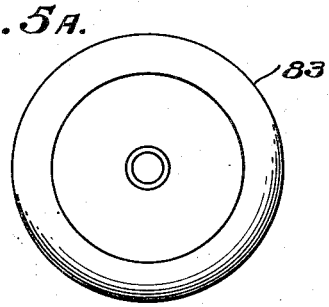
Inventor
Ernest G. Linder
By
Attorney Patented Feb. 25, 1941

2,233,263

UNITED STATES PATENT OFFICE 2,233,263

RESONANT CAVITY OSCILLATOR

Ernest G. Linder, Philadelphia, Pa., assignor to Radio Corporation of America, a corporation of Delaware Application November 30, 1938, Serial No. 243,211

11 Claims. (Cl. 250—36)

This invention relates to ultra high frequency oscillators and more specially to ultra high frequency resonant cavity oscillators.

The term "ultra high frequency oscillations" is generally applied to electromagnetic oscillations having a frequency of the order of 500 megacycles per second and upward. At the higher frequencies, for example, 3000 megacycles, it has been difficult to generate powerful oscillations. This difficulty has been due to the space characteristics of the thermionic tubes which are employed. The prior art devices have been known as magnetron and Barkhausen Kurz oscillators. In these oscillators, the radio frequency potentials are applied to the electrodes by means of resonant circuits.

The difficulties of generating radio frequency oscillations corresponding to a wave length of 10 centimeters will be appreciated by considering the physical size of a magnetron oscillator in which the anode electrode is a cylinder of the order of 2 millimeters radius and one centimeter length. In this arrangement, the anode is subjected to intensive heat when even low power oscillations are generated.

Thus, it is quite apparent that the space limitations of the thermionic oscillators of the prior art have prevented the generation of more than about 10 watts of ultra high frequency oscillatory energy. I propose to avoid structural limitations by employing tube elements which are not connected by resonant circuits and which do not themselves oscillate. In other words, the radio frequency potentials will not be applied to the tube elements which will further remove the restrictions of size. In place of resonant circuits, I propose to employ a cavity which will resonate to oscillations of a predetermined frequency. The cavity may have a size corresponding to a predetermined number of wave lengths. The oscillatory energy established upon the cavity may be collected by an appropriately arranged conductor within which the waves induce electromotive forces of the desired frequency.

As used in this specification, the term "free electrons" is applied to electrons within the field and external to the conductors. The free electrons are of two types: in-phase and out-of-phase. "In-phase" electrons is the term applied to free electrons which subtract energy. "Out-of-phase" electrons is the term designating free electrons which deliver their energy of motion.

It is one of the objects of the invention to provide means for generating ultra high frequency oscillations of greater power than has hitherto been practical. Another object of the invention is to provide means for establishing oscillations within a resonant cavity. A still further object is to arrange thermionic tube elements within a resonant cavity whereby free electrons establish resonant oscillations within the cavity. A still further object is to provide means for creating free electrons within a cavity which is adjusted to establish therein standing electric waves.

The invention will be described by referring to the accompanying drawings in which Figures 1 and 1A represent a schematic diagram of the invention; Figures 2 and 2A are schematic illustrations of a magnetic type of resonant cavity oscillator; Figures 3 and 3A are schematic illustrations representing a resonant cavity oscillator in which the standing waves are circularly disposed; Figure 3B is a graph representing the distribution of the amplitude of the electrostatic field in the standing wave in a device of the character of Fig. 3; Figures 4 and 4A represent a modification of Figs. 3 and 3A, to which a magnetic field has been added; and Figures 5 and 5A represent an oscillator in which a partially spherical resonant cavity is employed.

Referring to Fig. 1, within one end 1 of a hollow metallic cylinder 3 are suitably arranged on an insulator 5 a lattice-like cathode 7 and an accelerating electrode 9. The cathode is energized by a source of power 11 and the accelerating electrode is made positive with respect to the cathode by a battery 13. The end portion of the cylinder is surrounded by a solenoid 15 which is energized by a battery 17. The opposite end of the cylinder 3 includes a movable end portion 19 which is hermetically sealed to the cylinder by means of a bellows 21. The end plate is coupled to a screw 23 which is used to adjust the position of the movable end plate 19. A coupling loop 25 is inserted within the cylinder through suitable insulators.

The operation of the device is as follows: Electrons emitted by the cathode 7 proceed toward the accelerating electrode 9. Some of the electrons will reach the electrode, but most, due to the deflection of the magnetic field, will be projected past the electrode toward the walls of the cylinder 3.

Upon reaching the neighborhood of the cathode in a region roughly diametrically opposite to their place of emission, their radial motion will be reduced to zero and then reversed, and they will again be attracted towards the accelerating electrode. Thus an oscillatory motion in a radial direction will be established. An electron swarm will be formed about the electrode 9. The swarm consists of radially oscillating electrons, upon which a comparatively slow angular precession is superimposed by the magnetic field due to the solenoid 15. The sole purpose of the angular component of motion induced by the magnetic field is to cause a large portion of the electrons to miss electrode 9 and thus execute a substantial number of oscillations about it before being collected. The angular electron motion does not contribute directly to the establishment of the electric field oscillations. These oscillations are caused by the radial component of electron motion.

The oscillating electrons in the swarm will radiate energy into the surrounding space in the form of an electro-magnetic wave, whose frequency corresponds to the frequency of their own oscillatory motion, and whose electric vector is parallel to their own direction of motion. If the cavity is of suitable dimensions, standing waves will be set up. The electric field thus established will react upon the electrons in the swarm.

Originally (i. e., before the formation of a standing wave), the electrons oscillate with a random distribution of phases. However, due to the reaction of the electric field, a grouping is caused. Some electrons will be moving in phase with the electric oscillations of the field. These will gain energy and their amplitude of motion will increase. Their orbits will thus soon penetrate beyond the cathode 7 into the space between the cathode 7 and the cavity wall. This is a field free space insofar as nonoscillating fields are concerned, and all electrons reaching it will immediately travel to the cavity wall and be collected. Thus, in-phase electrons tend to be rapidly removed from the swarm. On the other hand, electrons which oscillate 180° out-of-phase are constantly moving in an a-c field which opposes their motion, and hence lose energy and remain much longer within the confines of the cathode. This lost energy of motion appears as energy of electromagnetic field oscillations. These electrons are eventually collected by the accelerating electrode 9.

Although, for the sake of clarity, the above discussion has been applied only to in-phase electrons and electrons 180° out of phase, it actually applies to all electrons. This follows, since all electrons may be put into one of two classes (1) those which are in phase during most of a cycle, and (2) those which are out of phase during most of a cycle. It is obvious that the grouping effect will occur for these two classes in much the same manner as for electrons in phase or out of phase during the entire cycle, as described above.

It should be understood that the magnetic field, potential of the electrodes and size of the resonant cavity should be adjusted to obtain the optimum oscillations within the cavity. The electric oscillations thus generated induce electromotive forces in the coupling loop 25 whose terminals are connected to an antenna, transmission line, or other useful load circuit.

Referring to Figs. 2 and 2A, the arrangement of Fig. 2 includes a hollow metallic cylinder 29. A portion 31 of the cylinder, intermediate the ends of the cylinder, is made of nonmagnetic material. The remaining portions of the cylinder are of magnetic material as represented by the symbols N and S, indicating, respectively, the north and south magnetic poles of a magnet or a solenoid. A cathode 33 is supported by a suitable insulation portion 35 arranged at one end of the cylinder. An adjustable end plate 37 is positioned at the opposite end of the cylinder in accordance with the construction previously described. The cathode 33 is energized by a battery 37. The cylinder is made positive with respect to the cathode by a suitable connection to a battery 39.

The operation of the foregoing device is essentially the same as that of Fig. 1. The magnetic field within the cylinder is represented by the dash lines 41. To avoid confusion, no attempt has been made to show the standing waves which are created and maintained by the excursions of the free electrons between the cathode 33 and the cylinder walls. While the electrons travel along curved paths, the radial component is used to deliver energy to the standing waves.

Referring to Figs. 3 and 3A, in this arrangement, resonant cavity 43 is again represented as a hollow metallic cylinder. A disc-like cathode 45 is arranged along the axis of the cylinder and adjacent one end plate. The cathode is energized by a battery 47. A disc-shaped grid 49 is positioned adjacent the cathode and made positive with respect thereto by a battery 51, in the manner of a Barkhausen Kurz oscillator. The walls of the cylinder are made negative with respect to the cathode by a battery 53. The pickup device may consist of a dipole antenna 55 which is connected to a transmission line 57. The axis of the dipole is substantially parallel to the axis of the cylinder. In this arrangement, the standing waves are circularly disposed as indicated by the lines 59 of Figs. 3A and 3B. The distribution of the electric amplitude is represented by the curve 61 of Fig. 3B.

Fig. 3A represents an end view of the interior of the cylinder. The circles represent wave fronts whose electric vectors are perpendicular to the plane of the paper. In Fig. 3B, a side view is shown, the electric lines of force being indicated. In this case, a strong oscillating field exists along the cylinder axis, and extends for a considerable distance from it in a radial direction. The field strength drops to zero at the cylinder walls. However, the field is uniform along the cylinder length and a strong field exists perpendicular to the cylinder ends at their central regions.

The positive grid, positioned at this region of strong field, causes oscillatory electron motion to occur there. The same type of electron grouping occurs as was described in connection with Fig. 1, with the resultant flow of energy directly from the moving electrons into the electromagnetic field, without the usual intermediate agency of oscillating electrodes.

Referring to Figs. 4 and 4A, the arrangement of Fig. 4 represents an oscillator of the resonant cavity type not unlike the device described by reference to Figs. 3 and 3A. The standing wave is of the same type as shown in Figs. 3A and 3B. The resonant cavity is preferably a hollow metallic cylinder 63. The ends of the cylinder are closed. A disc-like cathode 65 is located on the axis of the cylinder and adjacent one end. The cathode is energized by a battery 67. The cylinder is biased negatively with respect to the cathode by means of a battery 69. A ring-shaped accelerating electrode 71 is insulated from the cylinder walls and disposed concentrically with respect to the cathode. The anode is biased by a battery 73. A magnetic field is provided by energizing the solenoid 75 which surrounds the cylinder. The output connection comprises an antenna 77 which is connected to a transmission line 79.

The operation of the device does not differ materially from that of the previous oscillators. The strong field along the central axis is utilized. Electrons leave the cathode 65 in the form of a beam formed jointly by the action of cylinder 71 and the focusing effect of the magnetic field of the solenoid 75. A grouping effect, as described above, occurs. In-phase electrons travel to the cylinder as shown at 79, while out-of-phase electrons deliver their energy during successive oscillations as shown at 81, and eventually are collected by electrode 71. This electrode is cylindrically shaped and lies close to the wall of cylinder 63 so as not to distort the standing wave distribution in the resonant cavity.

In Figs. 5 and 5A, a partially spherical resonant cavity 83 is arranged within the spherical envelope 85. Free electrons are set up within the resonant cavity by the cathode 87, control grid 89 and electrode 91. In this arrangement, the standing waves established within the cavity are partially spherical in form. No load circuit is shown, but it should be understood that the load circuit may take the form of a pickup coil, antenna or the like.

Thus, the invention has been described as a resonant cavity oscillator. I am aware that G. C. Southworth, in his U. S. Patent 2,129,713, has described ultra high frequency oscillators which are positioned within a wave guide. The oscillators used by Southworth are of the conventional type. The radio frequency potentials established on the oscillator elements radiate waves which travel through the wave guide. As previously explained, my invention relates to a new form of oscillator in which the elements of the thermionic device create clouds of free electrons some of which deliver energy directly to create and maintain standing waves within a resonant cavity.

In the above-described devices, the resonant cavities have dimensions large compared to a wave length. The resonant cavity cylinders will be able to handle large cathode emission currents and very high accelerating electrode potentials. Large amounts of heat can be dissipated, since the accelerated electrons strike the external internal portion of the cylinder, and its entire surface serves to radiate the heat produced. The electrodes (cathodes and grid) are nonoscillating and thus consideration of electrode capacity and inductance play no part. These electrodes are limited in size only by geometrical considerations. It is evident that the currents, voltages and power involved are all much greater than those utilizable by any previous type of device operating at such high frequencies.

I claim as my invention:

1. In an ultra high frequency oscillator, a member including a resonant enclosure, said enclosure being substantially cylindrical in cross-section and closed at both ends and being further characterized by its freedom from electrical conductors extending from end to end along its axis and by the establishment therein of standing electrical waves, means including a cathode mounted substantially coaxially and adjacent one end of said enclosure and an accelerating member for creating clouds of free electrons within said enclosure, and means for orienting said movements of said electrons so that some of said electrons create and maintain said standing waves within said enclosure.

2. An ultra high frequency oscillator including, in combination, an enclosed resonant chamber, said chamber being substantially cylindrical in cross-section and closed at both ends and being further characterized by its freedom from electrical conductors extending from end to end along its axis and by the establishment therein of standing electrical waves, means including a cathode coaxially mounted at one end of said chamber and electron accelerating means for emitting swarms of moving free electrons within said chamber, said swarms including in-phase and out-of-phase electrons, means for directing the motion of said out-of-phase electrons so that their energy is delivered to maintain within said chamber standing waves.

3. An ultra high frequency oscillator of the character of claim 1, including means within said enclosure to derive electromotive forces from said waves and means for conveying said electromotive forces to a load circuit.

4. An ultra high frequency oscillator including an enclosed resonant chamber, said chamber being substantially cylindrical in cross-section and closed at both ends and being further characterized by its freedom from electrical conductors extending from end to end along its axis and by the establishment therein of standing electrical waves, means including a cathode coaxially mounted at one end of said chamber and electron accelerating means for creating clouds of moving free electrons within said chamber, and means for creating a magnetic field within said chamber to direct the movements of said electrons so that some of said electrons will create standing waves within said chamber.

5. An ultra high frequency oscillator including an enclosed resonant chamber, said chamber being substantially cylindrical in cross-section and closed at both ends and being further characterized by its freedom from electrical conductors extending from end to end along its axis and by the establishment therein of standing electrical waves, means for emitting free electrons within said chamber, and means including a grid positively charged and a potential source for biasing said chamber negatively with respect to said electron emitting means for directing the movements of said electrons so that at least some of them will deliver their energies to create and maintain within said chamber standing waves having cylindrical wave fronts.

6. An ultra high frequency oscillator including an enclosed resonant chamber, said chamber being substantially cylindrical in cross-section and closed at both ends and being further characterized by its freedom from electrical conductors extending from end to end along its axis and by the establishment therein of standing electrical waves, means for adjusting said chamber so that it will be resonant to said oscillations, means including a cathode mounted adjacent one end of said chamber and substantially coaxially therewith and electron accelerating means within said chamber for emitting free electrons, means for establishing a magnetic field within said chamber to direct the movements of said free electrons so that at least some of them will create standing electric waves within said chamber, and means for deriving electromotive forces from said waves.

7. An ultra high frequency oscillator including a chamber fabricated from magnetic elements separated by a nonmagnetic element, means for creating a magnetic field within said chamber and between said magnetic elements, means for emitting within said chamber free electrons, means for biasing the chamber walls with respect to said emitting means so that some of said free electrons move toward said walls and deliver their energy to create electric waves within said chamber.

8. In an ultra high frequency oscillator, a plurality of conductive members forming a resonant cavity of substantially cylindrical form closed at both ends and further characterized by the establishment therein of standing electric waves and by its freedom from electrical conductors extending between said ends along its axis, means including a cathode located adjacent one of said ends for emitting swarms of free electrons within said cavity, an accelerating electrode located adjacent said cathode and positively charged with respect thereto for effecting movements of said swarms of electrons, means including a source of potential for biasing said walls negatively with respect to said cathode for directing the movements of said electrons so that out-of-phase electrons deliver their energy to maintain circularly arranged standing electric waves within said cavity.

9. In an ultra high frequency oscillator, a plurality of conductive members forming a resonant cavity of substantially cylindrical form closed at both ends and further characterized by the establishment therein of standing electric waves and by its freedom from electrical conductors extending between said ends along its axis, means coaxially located within said cavity and adjacent one end thereof for emitting electrons, means insulated from and coaxially located within and adjacent to said one end of said cavity for accelerating said electrons, means for creating a magnetic field within said cavity for directing the movements of said electrons so that out-of-phase electrons create and maintain circularly arranged standing waves within said cavity.

10. In an ultra high frequency oscillator, a member including a resonant cavity of substantially cylindrical shape and having both ends closed, a cathode of disc-like form located coaxially within said cavity and adjacent one end thereof, an accelerating electrode located adjacent said cathode and positively charged with respect thereto, and means for charging said cavity negatively with respect to said cathode so that some of the electrons emitted from said cathode approach the boundary of said cavity and deliver their energy to establish and maintain within said cavity circularly arranged standing electric waves.

11. In an ultra high frequency oscillator, a member including a resonant cavity of substantially cylindrical shape and having both ends closed, a cathode of disc-like form located coaxially within said cavity and adjacent one end thereof, an accelerating electrode of disc-like form coaxially located within said cavity and adjacent said cathode, and means for charging said cavity negatively with respect to said cathode so that some of the electrons emitted from said cathode approach the boundary of said cavity and deliver their energy to establish and maintain within said cavity circularly arranged standing electric waves.

ERNEST G. LINDER.